(12) United States Patent
Yamashita et al.

(10) Patent No.: US 7,403,269 B2
(45) Date of Patent: Jul. 22, 2008

(54) SCANNING RANGEFINDER

(75) Inventors: Makoto Yamashita, Kyoto (JP); Hiroshi Kizukuri, Yashiyo (JP); Shinichi Tsukuda, Osaka (JP); Toshihiro Mori, Osaka (JP)

(73) Assignees: Nidec Corporation, Kyoto (JP); Hokuyo Automatic Co., Ltd., Osaka (JP)

( * ) Notice: Subject to any disclaimer, the term of this patent is extended or adjusted under 35 U.S.C. 154(b) by 225 days.

(21) Appl. No.: 10/906,135

(22) Filed: Feb. 4, 2005

(65) Prior Publication Data

US 2005/0168720 A1 Aug. 4, 2005

(30) Foreign Application Priority Data

Feb. 4, 2004 (JP) .............................. 2004-028395

(51) Int. Cl.
*G01C 3/08* (2006.01)
*G02B 7/182* (2006.01)

(52) U.S. Cl. ...................................... 356/5.01; 359/872

(58) Field of Classification Search ........ 356/4.01–5.15; 359/872–881
See application file for complete search history.

(56) References Cited

U.S. PATENT DOCUMENTS

| 508,072 | A | 11/1893 | Willngham |
| 3,813,140 | A | 5/1974 | Knockeart |
| 5,455,669 | A | 10/1995 | Wetteborn |
| 5,745,050 | A | 4/1998 | Nakagawa |
| 5,808,727 | A | 9/1998 | Katayama |
| 5,949,530 | A | 9/1999 | Wetteborn |
| 5,991,011 | A | 11/1999 | Damm |
| 6,262,800 | B1 * | 7/2001 | Minor ................... 356/139.07 |
| 6,265,725 | B1 | 7/2001 | Moll et al. |
| 6,411,374 | B2 | 6/2002 | Nakase et al. |
| 6,480,270 | B1 | 11/2002 | Studnicka et al. |
| 6,687,033 | B2 | 2/2004 | Pierenkemper |

(Continued)

FOREIGN PATENT DOCUMENTS

CH 680471 A5 8/1992

(Continued)

OTHER PUBLICATIONS

Official communication issued in the counterpart European Application No. 05002374, mailed on Apr. 12, 2007.

(Continued)

*Primary Examiner*—Isam Alsomiri
(74) *Attorney, Agent, or Firm*—Keating & Bennett, LLP

(57) ABSTRACT

Scanning rangefinder of simple, compact construction. The rangefinder is furnished with: an outer cover (1) in which a transparent window (2) is formed; a cylindrical rotary unit (3) inside the outer cover (1); a scanning/receiving window (4) provided in the rotary unit (3); a dual scanning/receiving mirror (5) disposed, angled, along the rotational axis of the cylindrical rotary unit (3); a motor (6) for rotationally driving the rotary unit (3); a disk part (13) arranged in the cylindrical rotary unit (3), anchored in an inside region thereof; a beam projector (14) anchored in a location where it is disposed slightly spaced apart from the rotational axis of the rotary unit (3); and a light receiver (16) anchored to, arranged coincident with the rotational axis of, the disk part (13) in the inside region of the rotary unit (3), and connected to a distance computation circuit (19).

21 Claims, 10 Drawing Sheets

U.S. PATENT DOCUMENTS

| | | | |
|---|---|---|---|
| 7,167,235 B2 * | 1/2007 | Kikuchi | 356/4.01 |
| 2001/0013929 A1 | 8/2001 | Torsten | |
| 2001/0035946 A1 | 11/2001 | Nakase et al. | |
| 2002/0041231 A1 | 4/2002 | Drinkard | |
| 2003/0043363 A1 * | 3/2003 | Jamieson et al. | 356/5.01 |
| 2005/0024625 A1 | 2/2005 | Mori et al. | |

FOREIGN PATENT DOCUMENTS

| | | |
|---|---|---|
| JP | S62-254008 A | 11/1987 |
| JP | H03-175390 A | 7/1991 |
| JP | H05-055226 A | 3/1993 |
| JP | H07-191142 A | 7/1995 |
| JP | H07-209080 A | 8/1995 |
| JP | H09-021872 A | 1/1997 |
| JP | H10-132934 A | 5/1998 |
| JP | H11-166969 A | 6/1999 |
| JP | 2000-028715 A | 1/2000 |
| JP | 2000-162318 A | 6/2000 |
| JP | 2001-318148 A | 11/2001 |
| WO | 93/20458 A | 10/1993 |

OTHER PUBLICATIONS

Official communication issued in counterpart European Application No. 05 022 374.6, mailed on Nov. 28, 2007.

* cited by examiner

SCANNING RANGEFINDER

BACKGROUND OF THE INVENTION

1. Technical Field

The present invention relates to so-called scanning rangefinders, designed to informationally receive, with an electromagnetic wave receiver connected to a distance computation circuit, reflection of electromagnetic waves that from an electromagnetic wave projector have been directed onto and scanned over scanning targets, and to computationally gauge the distance to the scanning targets.

2. Description of the Related Art

To date, two configurations, as represented in FIGS. 9 and 10, have been known for scanning rangefinders that use a rotating mirror(s) and wobble its optical axis over an entire 360-degree circuit. In either configuration the optical axis of the mirror(s) and the shaft of the motor that rotates the mirror (s) are made coincident.

The rangefinder in FIG. 9 is structured to employ a double-shaft motor 42 from which common rotary shafts 41a and 41b are jutted out vertically, with a scanning mirror 43 on the shaft 41a on the one hand, and a receiving mirror 44 on the shaft 41b on the other, being mounted in phase with each other. (At 45 in FIG. 9 is a beam projector; at 46, a ray receiver; at 47, a projection lens; and at 48, a receiving lens.) This configuration enables the rangefinder sensitivity to be raised, in that because the scanning optical system and the receiving optical system are completely separated, there is little straying of rays from the projection optical system into the receiving optical system, and in that there is little concern that surface reflection from the inner side of a scanning/receiving transparent window 53, nor that rays reflected from debris clinging to the transparent window 53, will enter the ray receiver 46.

The rangefinder in FIG. 10 is structured to employ a motor 42 from which a rotary shaft 41c is jutted upward, with a dual scanning/receiving mirror 49 being mounted on the rotary shaft 41c. Rays output from the beam projector 45 pass through a projection lens 50, is reflected downward by a semitransparent mirror 51, and is shone onto the dual scanning/receiving mirror 49; the rays reflected there are deflected leftward by the mirror 49 and cast onto a subject to be illuminated. Reflected rays from the scanned object are deflected upward by the scanning/receiving mirror 49, are transmitted through the semitransparent mirror 51, pass through a receiving lens 52, and enter the ray receiver 46. With this configuration there is no blind spot even at short range, since the scanning mirror (semitransparent mirror 51) and the receiving mirror (dual scanning/receiving mirror 49) are arranged coaxially on the motor 42; and there is a high degree of flexibility in installing the rangefinder, because the scanning mirror and receiving mirror are disposed unilaterally with respect to the motor 42.

Nevertheless, scanning rangefinders of the FIG. 9 structure suffer from the following drawbacks.

1) The fact that the motor 42 is disposed between the scanning mirror 43 and the receiving mirror 44 makes the distance between the optical axes of the scanning beam and received rays necessarily large. Consequently, at short range reflected rays do not enter the ray receiver 46, which produces a blind spot.
2) Because the center of the optical system is the center of the rangefinder, and the rangefinder is vertically extensive, restrictions on how the rangefinder may be installed result.

In turn, scanning rangefinders of the FIG. 10 structure suffer from the following disadvantages.

1) The semitransparent mirror 51 is used to make the optical axes of the scanning beam and received rays coincide, but in dividing rays the semitransparent mirror 51 lowers the amount of radiation by approximately one-half. This drop in luminous energy means that the power of the laser radiation from the beam projector 45, and the amplifying characteristics of the ray receiver 46, must be jacked up by four times overall, compared with the spilt-optics type of rangefinder of FIG. 9.
2) Inasmuch as the dual scanning/receiving mirror 49 is employed, projection-beam surface reflection off the inner side of the scanning/receiving transparent window 53, and rays reflected from debris clinging to the transparent window 53, enters the ray receiver 46 by way of the scanning/receiving mirror 49 and the semitransparent mirror 51, becoming noise, which consequently is prohibitive of heightening the radiation-receiving sensitivity of the rangefinder.

BRIEF SUMMARY OF THE INVENTION

An object of the present invention is in a scanning rangefinder to shorten the inter-optic-axial separation between the optical axis of the scanning beam directed at a subject, and the optical axis of the received subject-reflected rays taken into the rangefinder sensor. Thus shortening the inter-axial separation enables the rangefinder to be made so as not to give rise to a blind spot even with respect to subjects at close range.

Another object, moreover, is to segregate the scanning optical system from the receiving optical system. Separating the scanning and receiving optical systems prevents noise due to surface reflection from the scanning/receiving window and to rays reflected from debris clinging to the scanning/receiving window, enabling the radiation-receiving sensitivity to be heightened.

In addition, another object of the present invention is to realize a small-scale, low-cost rangefinder of simpler structure and that is more easily manufactured. The motivation behind this goal is to cope with increases in the demand for visual rangefinders in automated machinery, as automating and labor-saving conversions are continually being sought.

In order to accomplish these objectives, a scanning rangefinder in accordance with the present invention is configured with a ray-receiving section placed on a motor having a stationary shaft, with the ray-receiving section situated lying on the motor's rotational axis, and is configured to include a rotary section having at least a ceiling part situated in opposition to the ray-receiving section, and to include a motor-drive mechanism that drives the rotary section. Therein the scanning and receiving optical systems are disposed in between the ray-receiving section and the ceiling part. The rangefinder is additionally provided with a mirror wherein the underside of a predetermined inclined surface, or of a predetermined curved surface, in the ceiling part of the rotary section is rendered a reflecting surface; and the mirror serves both as scanning mirror for producing a scanning beam that is directed at a sensing subject, and as a receiving mirror for guiding reflection rays from the subject to the ray-receiving section. This will be called a dual scanning/receiving mirror hereinafter. In addition the rangefinder configuration includes, in the circumferential surface of a cylindrical part of the rotary section, a scanning/receiving window for passing the scanning beam and reflection rays. It will be appreciated that the aforementioned ceiling part may be constituted by the dual scanning/receiving mirror alone.

A scanning rangefinder involving another aspect of the present invention furthermore has, in addition to the structure described above, the following configuration. Namely, an image signal obtained by the ray-receiving section passes through a space within the stationary shaft of the motor portion of the rangefinder, and is led to a computation circuit that is external. Then to compute, from the image signal, position and like data on the subject, a signal indicating motor rotational position is at the same time led outside through the interior of the stationary shaft of the motor section. To handle rotational position detection, on the motor the rangefinder includes a unit, such as a rotary encoder or a resolver, with that function.

In the conventional scanning rangefinder configurations, the scanning mirror and receiving mirror are structured directly linked to the motor rotary shaft. This has meant either that the scanning optical system and the receiving optical system are separated above and below the motor, or that the two are integrated using a semitransparent mirror. Changing these into the configuration of the present invention makes it possible, without employing a semitransparent mirror, to dispose the ray receiver and the beam projector unilaterally with respect to the motor. What is more, in the conventional configuration in which a semitransparent mirror is not employed, the scanning mirror and the receiving mirror are individually provided, but in the present invention these mirror functions are served in common by a single scanning/receiving mirror, streamlining the internal structure of the rangefinder and making the structure more efficient. With the present invention configuration a rangefinder is realized in which, with the scanning optical system and the receiving optical system being unified, the inter-optic-axial separation between the beam-projection axis and the ray-receiving axis is shortened.

It should be noted that the ray-receiving section may be a photoelectric converter placed in the ray-receiving section location, or the received-radiation rays may be momentarily collected in that location, and then sent, by means such as an optical fiber, to another area to undergo processes including photoelectric conversion.

A scanning rangefinder in another aspect of the present invention is utilized as a visual sensor for ordinary robots and like devices. In such an installation of a rangefinder of the present invention, the beam-projection axis and the ray-receiving axis will be approximately coincident horizontally. Meanwhile, the rotational axis of the motor will be approximately coincident with the vertical. Therein, reflection rays reflected by at least the scanning/receiving mirror are guided to the ray-receiving section. Meanwhile, a scanning beam issues from the beam projector (radiation source), which is separately provided, is guided momentarily along the motor rotational axis or along a line parallel to the axis, and is converted by the scanning/receiving mirror provided in the ceiling part of the rotary section into an approximately horizontal scanning beam.

It should be understood that the scanning beam in the present invention may be any electromagnetic radiation. Accordingly, electromagnetic radiation here is the generic name given to every sort of electromagnetic wave, including visible light of course, and infrared rays, X rays, etc. The beam projector may be any electromagnetic-radiation wave propagator; it may be any device that projects electromagnetic waves as just defined. Likewise, the ray receiver may be any electromagnetic-radiation wave receiver; it may be any device that can receive as signals electromagnetic waves as just defined. Lastly, the dual scanning/receiving mirror may be any electromagnetic-radiation wave-scanning/-receiving dual reflector; it may be any device that reflects electromagnetic waves as just defined.

By the foregoing configuration, the present invention has the following effects.

(1) Utilizing solid-penetrating electromagnetic radiation such as X-rays makes it possible to probe, for example, concrete structures such as tunnels and buildings for the positions in which interior rebar is present, and the number of bars present.

(2) Because the beam-projection axis and the ray-receiving axis can be made to coincide or be adjacent, blind spots at close range either are not a problem in practice, or the range up to which they are not a problem can be made closer.

(3) Because the beam projector and the ray receiver are, along the rotary-component rotational axis, on the same rangefinder side in the interior of the rotary unit, there is a high degree of flexibility as to how the rangefinder can be installed. Especially in implementations of a rangefinder of the present invention in low-stature robots or driverless transport vehicles, the position of a subject can be detected just by slightly sticking out the leading end only of the rangefinder. A present invention rangefinder embodied in a robotic vacuum cleaner as an example of such implementations is effectual in that the device is thus in a form in which it maneuvers freely beneath chairs and tables.

(4) Given that the beam projector and the ray receiver are anchored to the rangefinder stationary side in the rotary unit interior, axial adjustment of the beam-projection axis and the ray-receiving axis can be made prior to incorporating the beam projector and the ray receiver into the interior of the rotary unit, which makes the axial adjustment operation extremely easy, and eliminates the necessity of complex axial adjustment work after the projector and receiver have been incorporated into the rotary unit interior.

(5) Owing to the dual-use scanning mirror and receiving mirror, the number of reflectors (mirrors) employed can be lessened.

(6) Rendering the outer cover and the rotary unit in the form of a truncated circular cone (frustum) prevents stray rays and unwanted reflections due to soiling of the inside surface of the transparent window and of the scanning/receiving window, making it possible to raise the radiation-receiving sensitivity to the maximum extent. Especially in applications in which scanning is by a laser, since the situation will be one in which, to ensure the safety of the human eye, the radiation-source power of the beam projector cannot be made greater than a prescribed value, with same the radiation-source power the sensing range can be extended, which is of great significance.

(7) In implementations in which the beam projector is disposed fixed to the stationary end, what has to be arranged into installation on the rotary unit, which is the movable section, are only the optical elements, including the scanning mirror and the receiving mirror, and a portion of the rotational position detector; electrical parts do not in the least have to be mounted there. On this account, a highly reliable design is enabled and maintenance is facilitated.

(8) By efficiently arranging inside the rotary unit the optical systems and ray receiver required for a scanning rangefinder, an extraordinarily small-sized, compact rangefinder is realized.

(9) Because the lines through which signals from the ray receiver and the rotational position detector are output pass through the hollow through-hole provided within the stationary shaft of the motor and lead to a distance computation circuit that is in the exterior, a rangefinder form whose outer scope is remarkably small-sized and compact compared to what has been conventional is realized.

From the following detailed description in conjunction with the accompanying drawings, the foregoing and other objects, features, aspects and advantages of the present invention will become readily apparent to those skilled in the art.

DETAILED DESCRIPTION OF THE INVENTION

In the following, an explanation of modes of embodying, and modified embodiments, of the present invention will be made with reference to the accompanying drawings.

Embodiment 1

Figure 1:
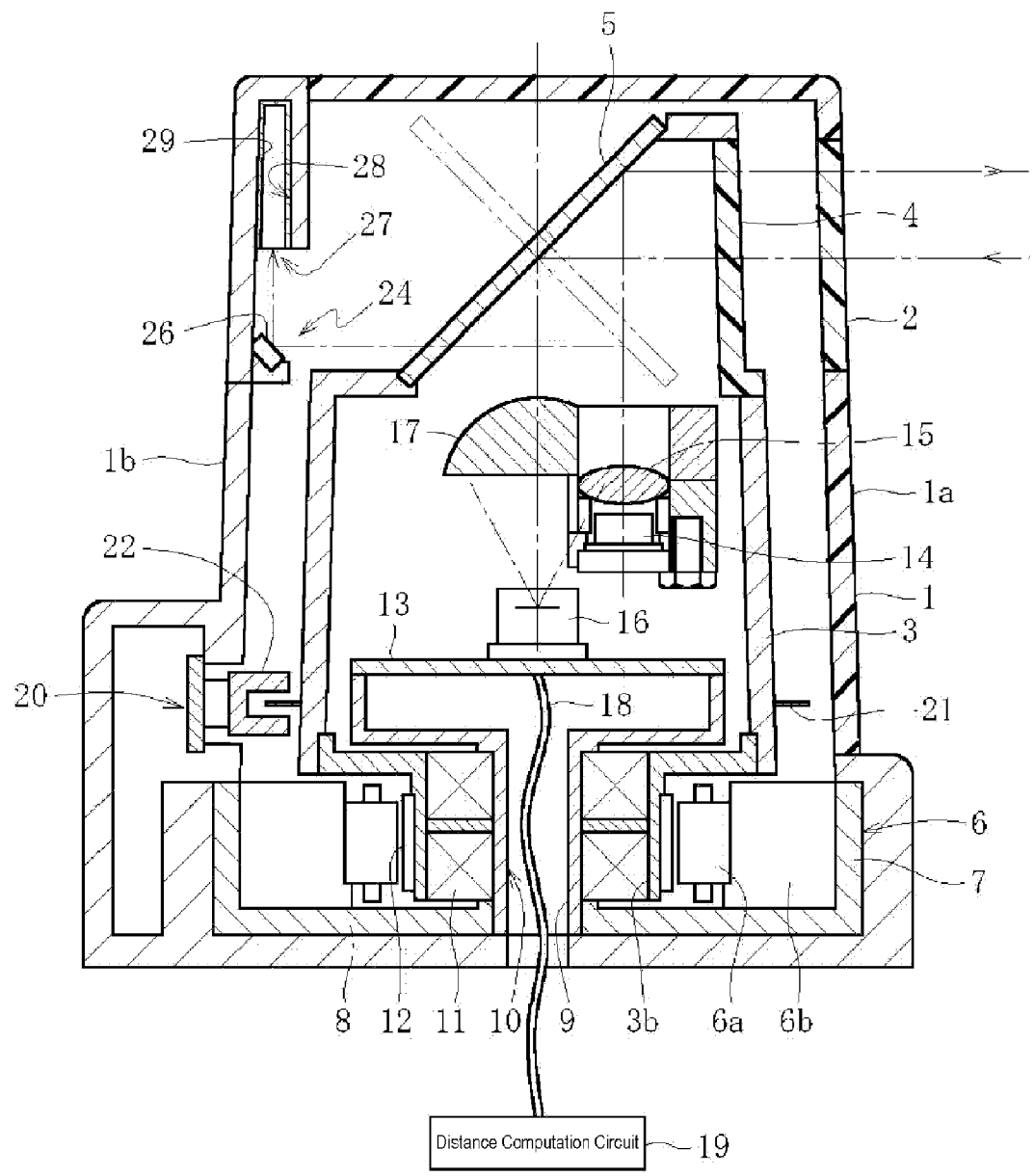
FIG. 1 is a vertical sectional view of a scanning rangefinder involving a first embodiment of the present invention.
Figure 2:
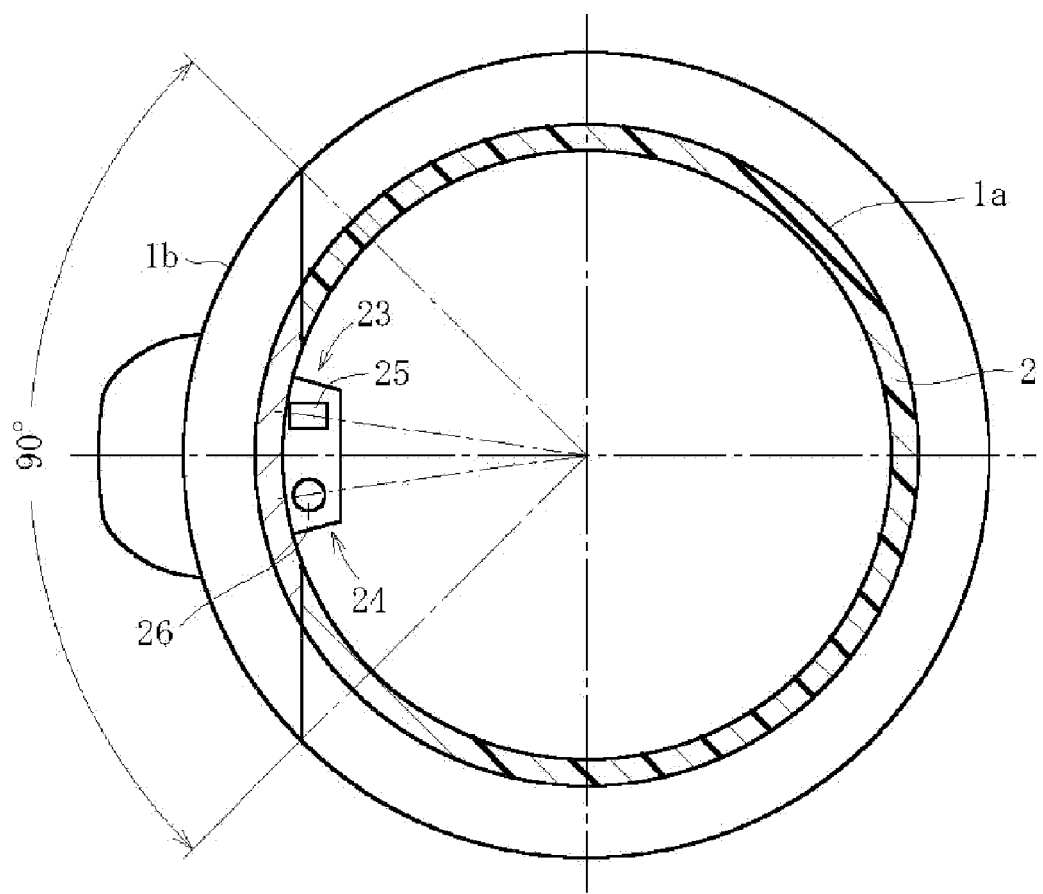
FIG. 2 is a transverse sectional view through a cylindrical rotary unit in the scanning rangefinder involving the first embodiment of the present invention.

FIGS. 1 and 2 illustrate a single example of a mode of embodying the present invention, in an implementation in which visible light is applied as the electromagnetic radiation, wherein reference numeral 1 in FIG. 1 indicates an outer cover (1) in the form of a round vertical frustum. The scanning rangefinder main unit is housed within the outer cover 1. In instances in which a scanning rangefinder of the present invention is utilized in a security robot or in a robotic vacuum cleaner, the outer cover 1 will be carried in the crown portion of such robots. The outer cover 1 includes a first member 1a constituted by a suitable material such as a synthetic polymeric resin, and a second member 1b constituted by an opaque material such as metal or an appropriate synthetic polymeric resin. As illustrated in FIGS. 1 and 2, a transparent window 2 is formed through, for example, 270 degrees in the encompassing wall of the first member 1a. The transparent window 2 can be a transparent member separate from the principal material of the outer cover 1, formed into a seamless partial annulus of 270 degrees and inset into the position for the transparent window; alternatively, the first member 1a itself can be formed as a whole from a transparent material. It should be noted that if the first member 1a is made entirely transparent, rendering it in a form in which the reach of the transparent window is extended over the entirety of the first member 1a, as a precaution, measures should be taken to keep unneeded external light from entering the ray receiver. The second member 2b is formed as a partial annulus disposed in a sweep of predetermined angle—90 degrees for example.

A cylindrical rotary unit 3 is installed along the inside of the outer cover 1, arranged at a spacing from the outer cover 1. The cylindrical rotary unit 3 is constituted from a suitable material such as a synthetic polymeric resin, and, in a location whose height corresponds to that of the transparent window 2 in the outer cover 1, is furnished with a scanning/receiving window 4 that passes reflected light from a dual scanning/receiving mirror, to be described later, and a scanning target. An additional dual scanning/receiving mirror 5 is anchored at a rightward angle of 45 degrees into the top plate over the rotary unit 3. The lower part of the rotary unit 3 is diametrically constricted to render rotary unit lower-end portion 3b.

At this end of the rangefinder main unit, on the bottom-plate portion of the outer cover 1, a motor 6 is installed, arranged so that its axis coincides with a line plumb to the cover bottom. The motor 6 includes: a stator 6a made up of coil windings and a core; a retaining member 6b, to the inner circumferential surface of which the stator 6a is fixed; a cylindrical section 7, on the inner circumferential of which the retaining member 6b is situated; parallel with the bottom-plate portion of the outer cover 1, a bottom plate section 8 continuous with the cylindrical section 7; and a motor stationary shaft 9 formed in the center of the bottom-plate section 8. A hollow through-hole 10 is provided in the interior of the motor stationary shaft 9, penetrating it vertically.

The configuration of the motor 6 also includes a bearing 11 whose inner circumferential surface is fixedly fit onto the outer circumferential surface of the motor stationary shaft 9, wherein the inner-diametric surface of the rotary unit lower-end portion 3b of the cylindrical rotary unit 3 is rotatively fitted onto the outer circumferential surface of the bearing 11. The bearing 11 is constituted as a ball bearing, a slide bearing, or a fluid dynamic-pressure bearing, for example. Furthermore, a magnet 12 is attached to the outer circumferential surface of the rotary unit lower-end portion 3b, opposing the stator 6a at a slight clearance. The motor 6 generates rotational drive power by the magnet 12, disposed on the outer periphery of the lower end of the rotary unit 3, being attracted by the rotating magnetic field generated by the stator 6a. Accordingly, the motor may be a brushless dc motor, or may be a synchronous motor or other similar motor.

A horizontal disk part 13 is fixed to the upper end of the motor stationary shaft 9. A beam projector 14 is anchored inside the cylindrical rotary unit 3, where it is disposed spaced apart from the rotary unit 3, in a location on the stationary side of the main unit, alongside the rotational axis of the disk part 13. For the beam projector, 14 a light source such as a laser or LED is chosen. A scanning lens 15 that regularizes the beam diameter is situated at the upper end of the beam projector 14.

A light receiver 16 is situated in the center of the disk part 13, anchored to its upper surface. The light receiver 16 is constituted by an optical sensor such as a photodiode, and the focal point of a receiving lens 17 is adjusted to the light receiver 16. By means of a signal line (harness) 18, the light receiver 16 is connected to a distance computation circuit 19 that is situated outside the outer cover 1 (in a control unit for the security robot or robotic vacuum cleaner). A rotational position detector 20 for precision-detecting rotational angles is disposed along the periphery of the cylindrical rotary member 3. The rotational position detector 20 of the illustrated example is composed of a plurality of shielding slats 21 as a motor drive clock, fixed to and evenly arranged on the outer circumferential surface of the cylindrical rotary unit 3, and a photointerrupter (optical interrupter switch) 22 disposed along the course through which the motor drive clock 21 travels. It will be appreciated that the shielding slats 21 may be made by forming uniform holes in an annular plate. By obtaining, for example, 18 pulses for every revolution of the rotary unit 3 and, using a phase-locked loop circuit to frequency-divide them into, for example, 1024 pulses, the rotational position detector 20 is able to detect the rotational position of the rotary unit 3. It will be appreciated by those skilled in the art that as an alternative to the foregoing configuration, another possibility is, for example, to provide a magnet on the perimeter of the rotary unit 3, and provide a Hall sensor in a position adjacent the course through which the magnet passes. Likewise, the rotational position detector can also be realized by, for example, providing a magnetic element on the perimeter of the rotary unit 3, and providing a magnetic sensor in a position adjacent the course that the magnetic element passes through.

A further feature of the present scanning rangefinder is that two types of calibrators are incorporated into the inner-surface wall of the second member 1b of the outer cover 1—a zero calibrator 23 for stabilizing the rangefinder's distance measurements, and a photoabsorber-based noise calibrator 24.

Figure 3:
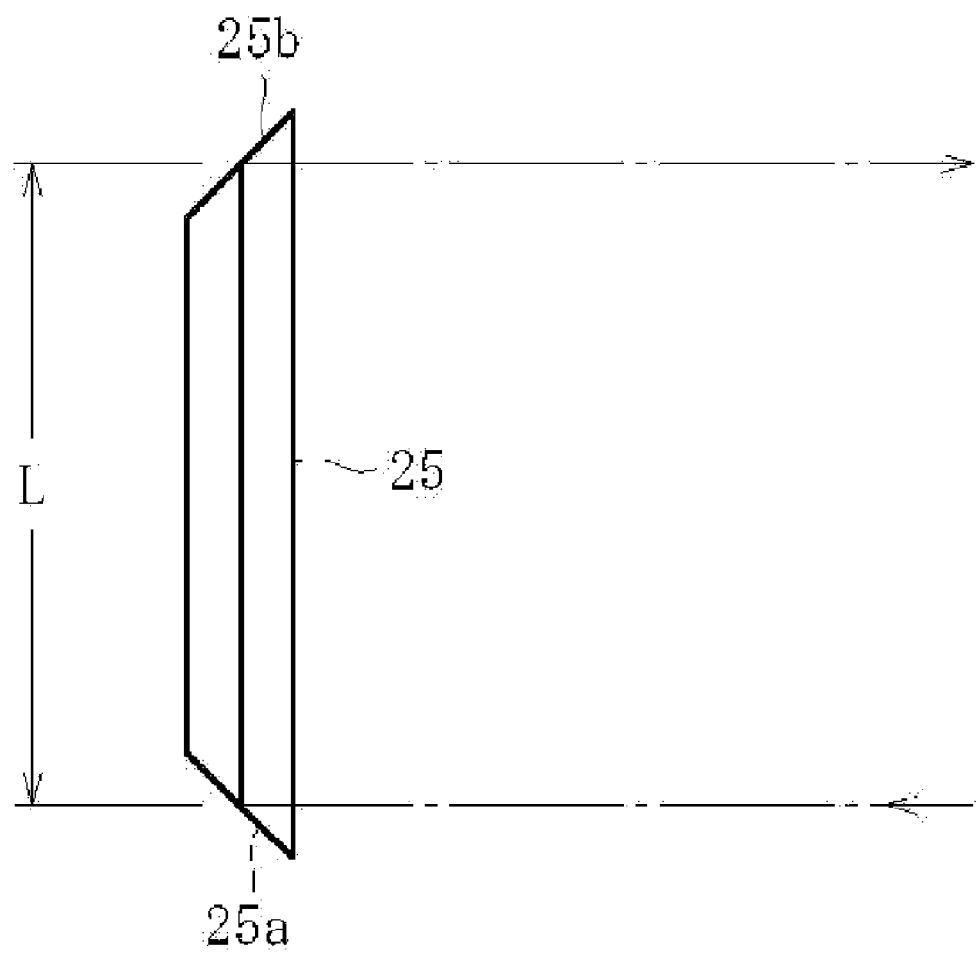
FIG. 3 is an enlarged elevational view of a prism mirror as a zero calibrator for a scanning rangefinder of the present invention.

The former, the zero calibrator 23, realizes zero calibration by the rangefinder gauging inside itself, while in a reverse-detecting mode, to a standard length. The zero calibrator 23 is furnished with a trapezoidal prism mirror 25, as illustrated in FIG. 3, anchored in a vertical disposition. When the rangefinder makes a calibration, the vertically upward heading beam projected from the beam projector 14 is reflected horizontally to the left by the dual scanning/receiving mirror 5, is reflected vertically upward by a first reflective surface of 25a of the prism mirror 25, and is reflected horizontally to the right by a second reflective surface 25b of the prism mirror 25. When the beam is thus reflected from the projector 14, by the interval between the first (incoming) reflective surface of 25a and the second (outgoing) reflective surface 25b, the outgoing beam is offset from the incoming beam by the correct displacement (L) between the optical axes of the beam projector 14 and the light receiver 16, and projected onto the scanning/receiving mirror 5. Thus the outgoing beam is reflected plumb downward by the scanning/receiving mirror 5 and is directed onto the light receiver 16, where zero calibration is implemented. This zero calibration is carried out at every revolution of the cylindrical rotary unit 3.

As to the latter, the photoabsorber-based noise calibrator 24, in rangefinder implementations in which, as will be described later, the scanning beam is pulsed by means such as a laser cavity, the calibrator 24 is utilized for noise elimination.

Herein, for the beam projector typically a laser would be made the light source, but it is also possible to employ an LED as the light source. With lasers, spreading of the light shaft is slight, and the beam can be readily passed along narrow pathways, and therefore the form of the rangefinder can be held down to minimal size. In implementations in which LEDs are to be employed, it is desirable to adopt LEDs with which high-frequency modulation is possible. Because the light spot of LEDs, distinct from lasers, is large, LEDs have advantages over lasers, which owing to safety reasons have restrictions on power. The optical system that guides the beam from the beam projector to the upper part of the rotary unit is not limited to direct radiators and mirrors; adopting an optical system of choice, such as optical fiber, is also possible.

Further, the beam projector may be installed on the rotary side, or it may be installed on the stationary side. An advantage to implementations in which the beam projector is installed on the rotary side is that since a fixed positional relationship between the beam projector and the dual scanning/receiving mirror is maintained by the beam projector and the scanning/receiving mirror being installed on the rotary side, how high the beam is when it leaves the rangefinder never varies. On the other hand, advantages to implementations in which the beam projector is installed on the stationary side are not only that supply of power to the projector is facilitated, but that the optical axes of the beam projector, the scanning/receiving mirror, and the light receiver can be aligned before these components are incorporated into the rotary unit, which makes alignment of the optical axes easier and more highly precise.

The operation of a scanning rangefinder configured as in the foregoing will be described next. The beam from the beam projector 14 is projected vertically upward, by way of the scanning lens 15, and is reflected horizontally by the dual scanning/receiving mirror 5. The scanning/receiving mirror 5 rotates at high speed together with the cylindrical rotary unit 3, and thus the beam reflected off the mirror 5 goes through the scanning/receiving window 4 in the rotary unit 3 and the transparent window 2 in the outer cover 1, and is continuously swept over a 270-degree range in the space surrounding the rangefinder and scanned onto a surrounding scanning target. Meanwhile, light reflected by the scanning target enters the inside of the outer cover 1 through the transparent window 2 and, through the scanning/receiving window 4, is incident on the scanning/receiving mirror 5 in an approximately horizontal orientation. The incident light, reflected plumb downward by the scanning/receiving mirror 5, is then focused by the receiving lens 17 onto the light receiver 16.

It will be understood that, due to the presence of the second member 1b, made from an opaque material, in the outer cover 1, within about a 90-degree range scanning targets cannot be scanned. Nevertheless, by rotating, or by pivoting through a predetermined angle, the rangefinder itself, scanning targets in a location originally to the rear of the second member 1b can also be scanned.

Once scanning-target light has entered the light receiver 16, information relating to the rotational angle of the cylindrical rotary unit 3 during reception of light through the light receiver 16 is detected by the rotational position detector 20, and this information, together with information as to the phase of the light through the light receiver 16 is sent by the signal line 18 to the distance computation circuit 19. The distance computation circuit 19 computes, based on the phase information, the distance to the scanning target and combines the computed distance and the rotational position information from the rotational position detector 20 to prepare a planar, two-dimensional map. From this map the two-dimensional distribution, as well as the two-dimensional contour, of scanning targets through 270 degrees of the surroundings centered on the rotational axis of the cylindrical rotary unit 3 are known, and base data for determining the directions in which a security robot or a robotic vacuum cleaner can travel is obtained. It will be appreciated that the output necessary for this computation—that is, the output signal from the light receiver 16, and the rotational position information output from the rotational position detector 20—goes along the signal line 18, which passes through the hollow through-hole 10 within the stationary shaft 9 interior and connects to the distance computation circuit 19. This efficacious, compact arrangement of the motor and the optical systems enables the realization of a scanning rangefinder in a form whose outer scope is markedly small and streamlined compared with devices to date.

Although the system for computing the distance to the scanning target is not particularly limited, amplitude-modulation- (AM-) based processing is typical. In AM-based processing, the rangefinder laser or LED light is modulated at a given constant frequency, and the distance between the rangefinder and the scanning target is found from the difference between the phase of the modulated signal and the phase of the light reflected from the target. More specifically, once a beam modulated at a frequency f strikes a scanning target, is reflected, and comes back, the returned light will have a phase difference $\phi$ determined by its speed and the distance between the target and the rangefinder. Thus the numerical value of the phase difference $\phi$ depends on the speed of the light c and the to-target distance $L_0$. This means that the distance $L_0$ can be found by detecting the phase difference $\phi$. Accordingly, by horizontally swinging the scanning beam using the dual scanning/receiving mirror, distances in a two-dimensional area can be gauged. The present invention is usable fundamentally as a two-dimensional rangefinder, but can also gauge distances in three-dimensional regions by scanning the scanning beam through a predetermined angle while continuously increasing/decreasing the vertical angle of the scanning/receiving mirror. In instances in which three-dimensional distance measurements are to be made, the surrounding space is targeted by scanning in a helical fashion, for example.

Figure 4:
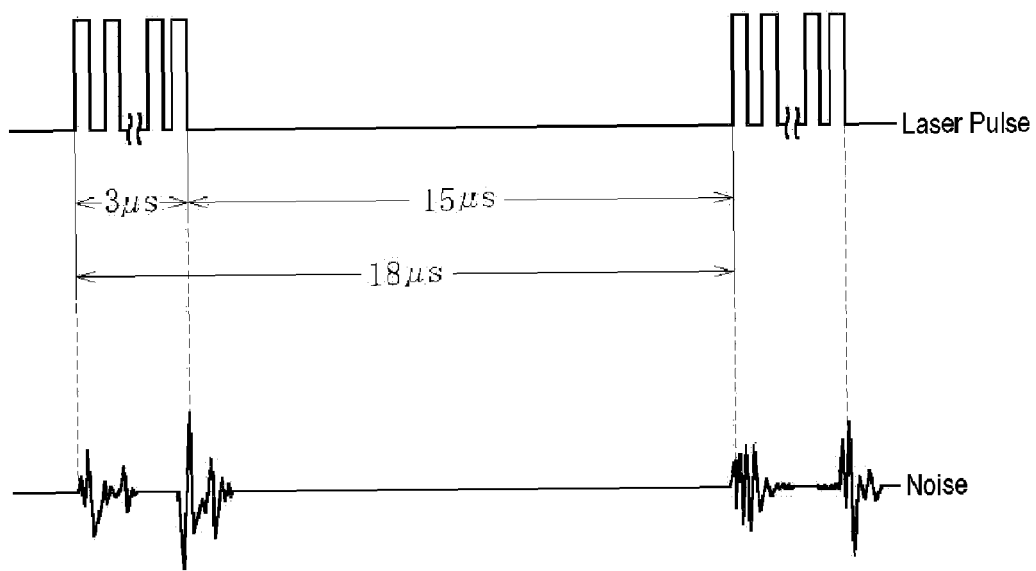
FIG. 4 is a diagram of the pulsed oscillation waveform and noise waveform of laser pulses from an embodiment in a scanning rangefinder of the present invention.

A further consideration is that in implementations in which the light source for the beam projector 14 is to be by a laser, the fact that the spot diameter of the irradiated beam is small can in terms of safety management place restrictions on the energy of the projection beam. In such cases, it is better to have the signal beam issuing from the laser be pulsed, as represented in FIG. 4, rather than continuous. In the illustrated example, the pulsed output has a period of 18 μs, with a 3 μm pulse duration and a 15 μm pause duration. In such implementations, the laser output energy can be reduced to ⅙ that of continuous-beam output. However, in cases in which the beam is thus pulsed, since noise is generated when the pulses start and when they stop, measures against the noise to eliminate its effects are necessary.

What eliminates such noise in the present invention is the noise calibrator 24. The noise calibrator is constituted by a photoabsorber-directed mirror 26 and a photoabsorbing unit 27. The photoabsorber-directed mirror 26 is fixed, angled at 45 degrees with respect to the vertical, to the wall of the second member 1b on its inner side. The photoabsorbing unit 27, which is anchored into position vertically above the photoabsorber-directed mirror 26, is constituted by a photoabsorber mounting socket 28, and a photoabsorber 29, being, for example, black velvet that is adhered onto, or numerous thin spinelike elements that are embedded into, the inner surface of the photoabsorber mounting socket 28. In implementations in which the lasing beam is pulsed, as represented in FIG. 4, considerable noise is generated at the start and at the stop of a lasing pulse—especially when the lasing beam is stopped. On that account, the dual scanning/receiving mirror 5 reflects, horizontally leftward in FIG. 1, rays from when the lasing beam is stopped, and in turn the photoabsorber-directed mirror 26 reflects the rays vertically upward, so that the rays are absorbed in the photoabsorbing unit 27. Thus deflecting and absorbing optical noise from the laser pulses prevents the noise from being input into the light receiver 16. Noise calibration is effected by a lasing beam from which noise has thus been absorbed being incident on the light receiver 16, and by this noise-absorbing operation being implemented when the laser is stopped and/or started other than when the beam is being pulsed.

First Modification

Figure 5:
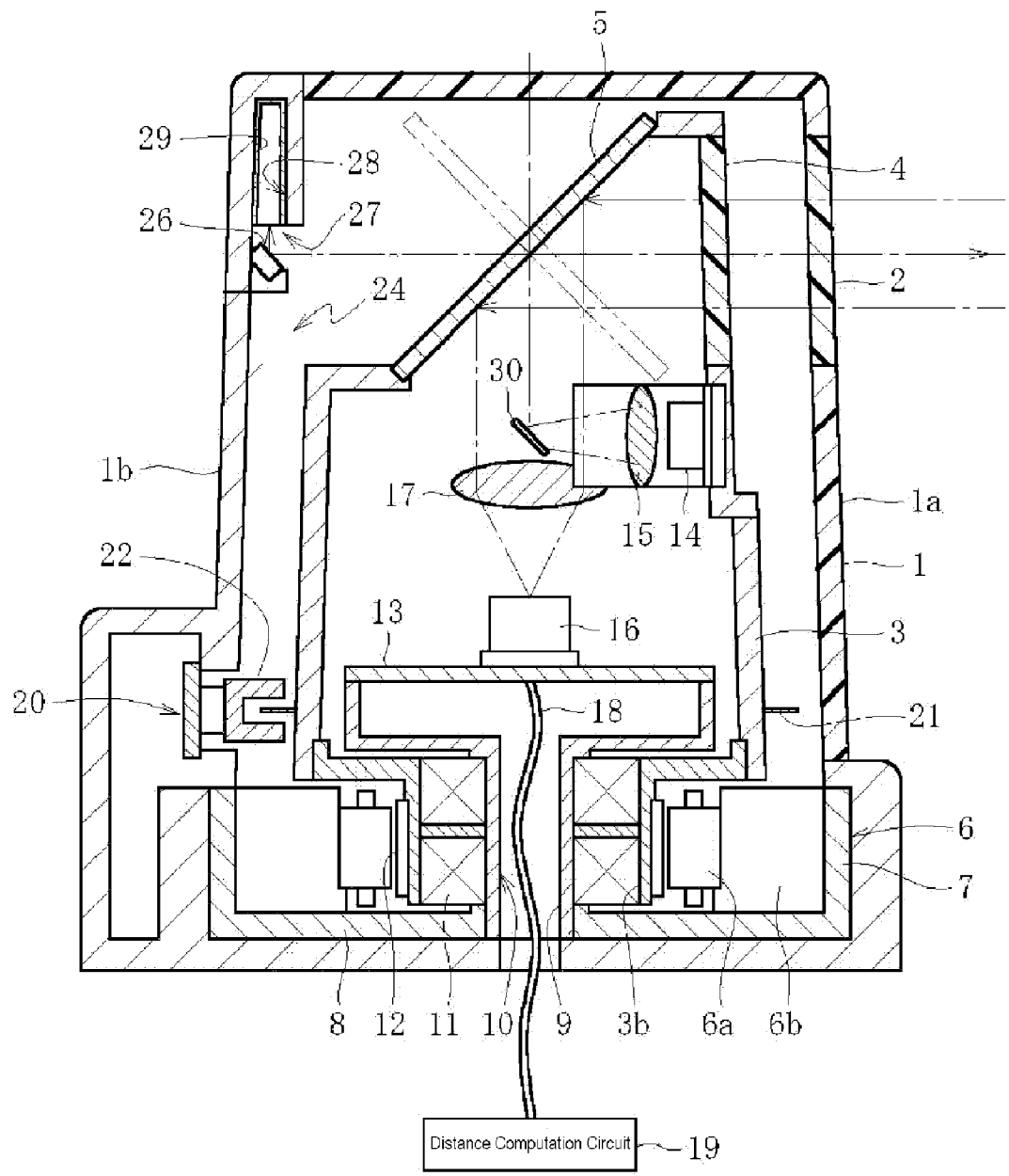
FIG. 5 is a vertical sectional view of a scanning rangefinder involving the first embodiment of the present invention.

Next, a first mode of modifying the present invention will be described based on FIG. 5. In this modification, the beam projector 14 is provided on the wall of the cylindrical rotary unit 3, disposed on its inner side, with the rangefinder being rendered so that a horizontal beam from the beam projector 14 is concentrated by the scanning lens 15, switched into a vertical orientation by a scanning mirror 30 disposed on the rotational axis of the rotary unit 3 and above the receiving lens 17, and shone onto the dual scanning/receiving mirror 5. A further aspect of the modification is that, along with making the scanning beam from the beam projector 14 collinear with the rotational axis, the photoabsorber-directed mirror 26 is installed in a high position on the second member 1b of the outer cover 1, so that the beam reflected by the scanning/receiving mirror 5 can be received by the photoabsorber-directed mirror 26 of the noise calibrator 24. It should be understood that for ease of comprehension, the size of the scanning mirror 30 is drawn large, but in implementations in which the light source for the beam projector 14 is a laser, the spot diameter can be made small, thus enabling the outer diameter of the scanning mirror 30 to be made small, at a size at which degradation in light-receiving sensitivity originating in the presence of the scanning mirror 30 is virtually not a problem.

In this modification instance, a beam exiting the beam projector 14 gets projected horizontally into the surrounding space on a course defined by the scanning lens 15, the scanning mirror 30, the scanning/receiving mirror 5, the scanning/receiving window 4, and the transparent window 2; and light reflected from a scanning target is received through a course defined by the transparent window 2, the scanning/receiving window 4, the scanning/receiving mirror 5, the receiving lens 17, and the light receiver 16. The subsequent creation of a two-dimensional map is done in the same manner as was described for the embodiment of FIG. 1.

With this modification, the beam projector and the light receiver are arranged on the inner side of the cylindrical rotary unit, and from the beam projector the projection beam strikes the scanning/receiving mirror having come out along the rotational axis. As a result, the scanning optical system and the receiving optical system are completely separate; in particular, because the projection beam only strikes the scanning/receiving mirror at the rotational center, light back-reflected from the scanning optics entering the receiving optical system is not an issue. The light-receiving sensitivity is accordingly improved. Moreover, by making the beam projector and the light receiver unitary and anchoring them to the inside of the cylindrical rotary unit, optic-axial adjustment of the beam projector and light receiver can be made prior to their incorporation into the inside of the rotary unit, thus enabling stabilized adjustment of, with minimal disparity between, the optical axes of the beam projector and light receiver. Further still, by adopting the dual scanning/receiving mirror, even should there happen to be optic-axial inconsistency due to displacement between the optical axes of the beam projector and light receiver, compared with devices that employ both a scanning mirror and a receiving mirror, the scanning point (area where the beam strikes) on the scanning target is altered only slightly, which does not influence the detection of position nor the precision of detection. In this modification furthermore, situating the beam projector and light receiver in the interior of the cylindrical rotary unit contributes to rendering a compact rangefinder. And since mirrors need not be mounted on the inside of the outer cover, the height of the rangefinder may be made all the lower. It will be appreciated that in gauging distances in a two-dimensional or three-dimensional region by circular scanning, the scanning angle of the beam must be accurately detected; the present invention is furnished with the rotational position detector on the cylindrical rotary unit, and thus the rotational position of the rotary unit can be detected accurately.

Second Modification

Figure 6:
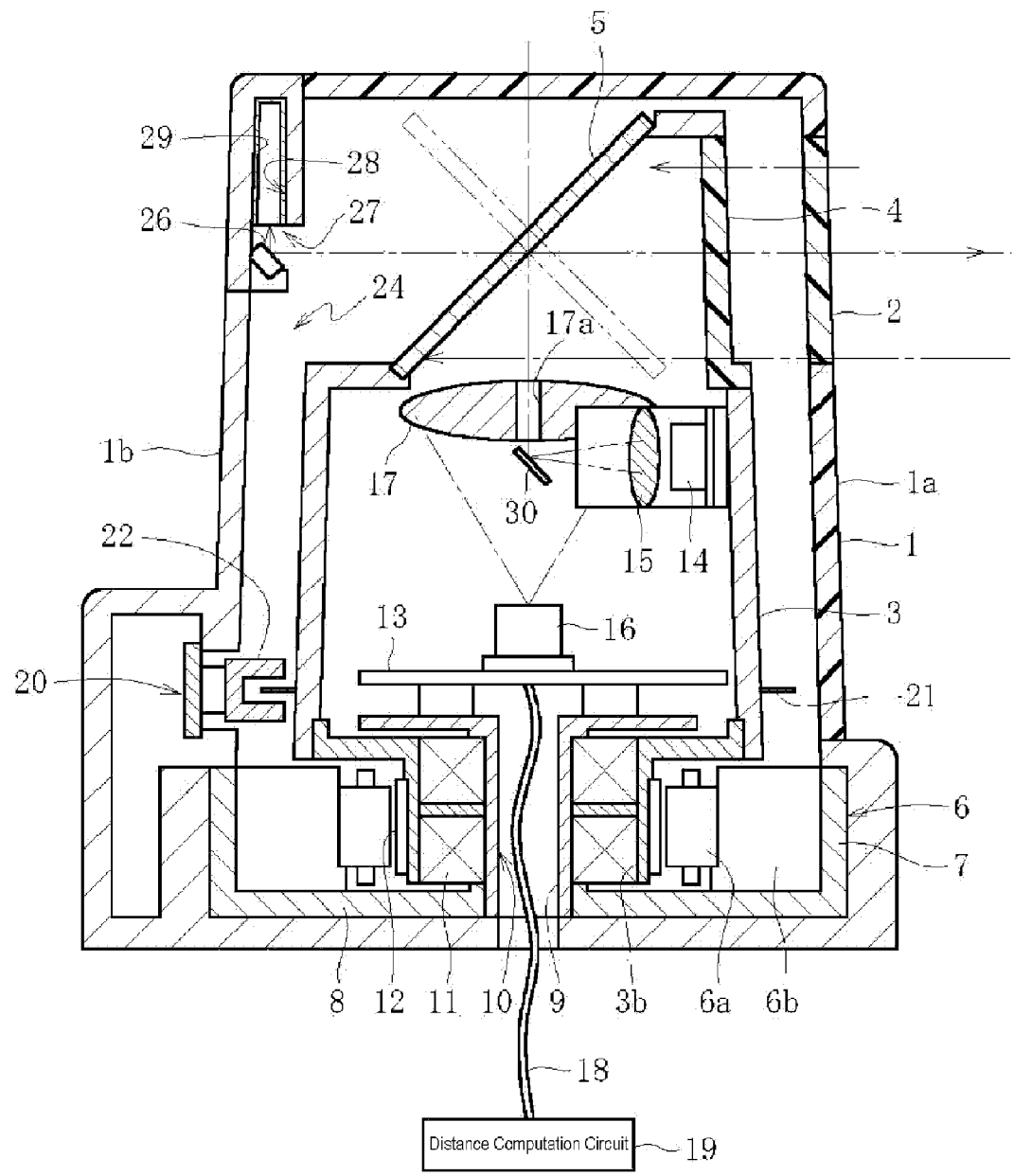
FIG. 6 is a vertical sectional view of a scanning rangefinder involving a second embodiment of the present invention.

Next, a second modification of the present invention will be described based on FIG. 6. In a like manner to the modification of FIG. 5, in this modification the beam projector 14 is arranged on the wall inner-side of the cylindrical rotary unit 3, with the beam being directed horizontally from the beam projector 14, concentrated by the scanning lens 15, and shone onto the scanning mirror 30. In this case, however, the scanning mirror is arranged beneath the receiving lens 17, and a clearance hole 17a for passing the rays reflected by the scanning mirror 30 is provided in the central portion of the receiving lens 17, to prevent the rays reflected by the scanning mirror 30 from being absorbed by the receiving mirror 17. The configuration is otherwise similar to that of the first modification, illustrated in FIG. 5. It should be understood that in implementations in which the light source for the beam projector 14 is a laser, the spot diameter can be made small, thus enabling the inner diameter of the clearance hole 17a in the receiving lens 17 to be made small, at a size at which degradation in light-receiving sensitivity originating in the presence of the scanning mirror 30 is virtually not a problem.

In this modification instance, a beam exiting the beam projector 14 gets projected horizontally into the surrounding space on a course defined by the scanning lens 15, the scanning mirror 30, the clearance hole 17a in the receiving lens 17, the scanning/receiving mirror 5, the scanning/receiving window 4, and the transparent window 2; and light reflected from a scanning target is received through a course defined by the transparent window 2, the scanning/receiving window 4, the scanning/receiving mirror 5, the receiving lens 17, and the light receiver 16. The subsequent preparation of a two-dimensional map is done in the same manner as was described in the embodiment of FIG. 1.

With the configurations of the first and second modifications, because a scanning mirror is arranged on the rotary unit's rotational axis, the light-receiving sensitivity is lowered in proportion to what the reflecting surface area of the scanning mirror is, but since the axes of the projection beam and of the reflection light from the scanned object coincide, blind spots are eliminated. Another advantage is that since the scanning and receiving optical systems are completely separate, there is no chance that back-reflected components of the scanning beam will enter into the light receiver. And in this modification as well, situating the beam projector inside the cylindrical rotary unit makes it possible to render rangefinder more compact. What is more, since mirrors need not be mounted on the inside of the outer cover, the height of the rangefinder may be made all the lower.

Third Modification

Figure 7:
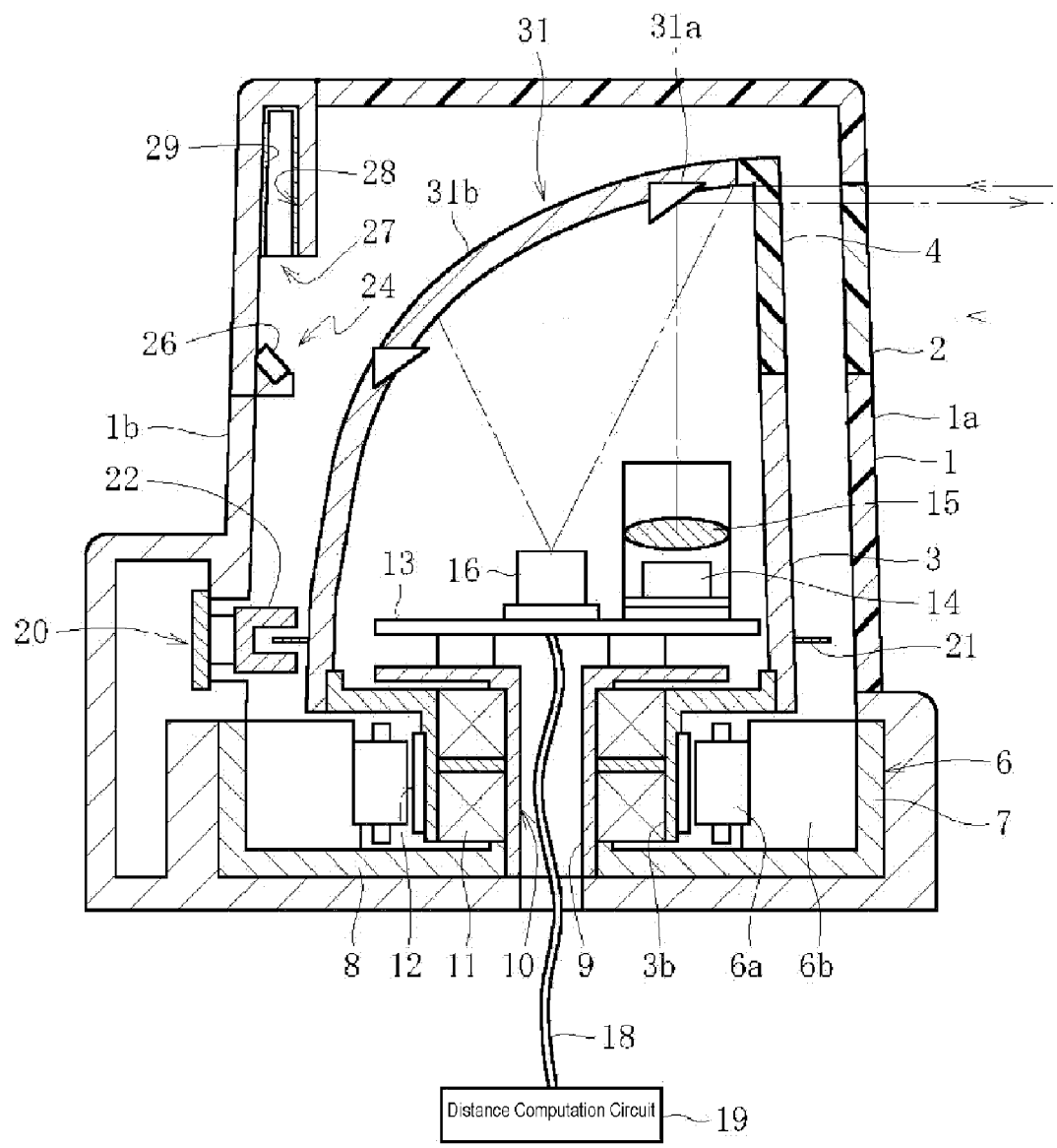
FIG. 7 is a vertical sectional view of a scanning rangefinder involving a third embodiment of the present invention.

Next, a third modification of the present invention will be described based on FIG. 7. In this modification, the beam projector 14 and the scanning lens 15 are anchored on the disk part 13, in a position adjacent the light receiver 16, and the dual scanning/receiving mirror 31 is furnished with an annular scanning mirror section 31a, prismatic in cross-section, that reflects rays concentrated by the scanning lens 15, and a receiving mirror-lens section 31b that reflects and concentrates reflection rays from an scanned object, and is disposed at a rightward angle of 45 degrees from the vertical. Apart from these configurational aspects—the location of the beam projector/scanning lens, and form of the scanning/receiving mirror—and excepting particulars, this modification basically is similar to the embodiment illustrated in FIG. 1.

In this modification instance, a beam exiting the beam projector 14 gets projected horizontally into the surrounding space on a course defined by the scanning lens 15, the scanning mirror section 31a of the scanning/receiving mirror 31, the scanning/receiving window 4, and the transparent window 2; and light reflected from a scanning target is received through a course defined by the transparent window 2, the scanning/receiving window 4, the receiving mirror-lens section 31b of the scanning/receiving mirror 31, and the light receiver 16. The subsequent creation of a two-dimensional map is as has been detailed earlier with reference to FIG. 1.

Embodiment 2

Figure 8:
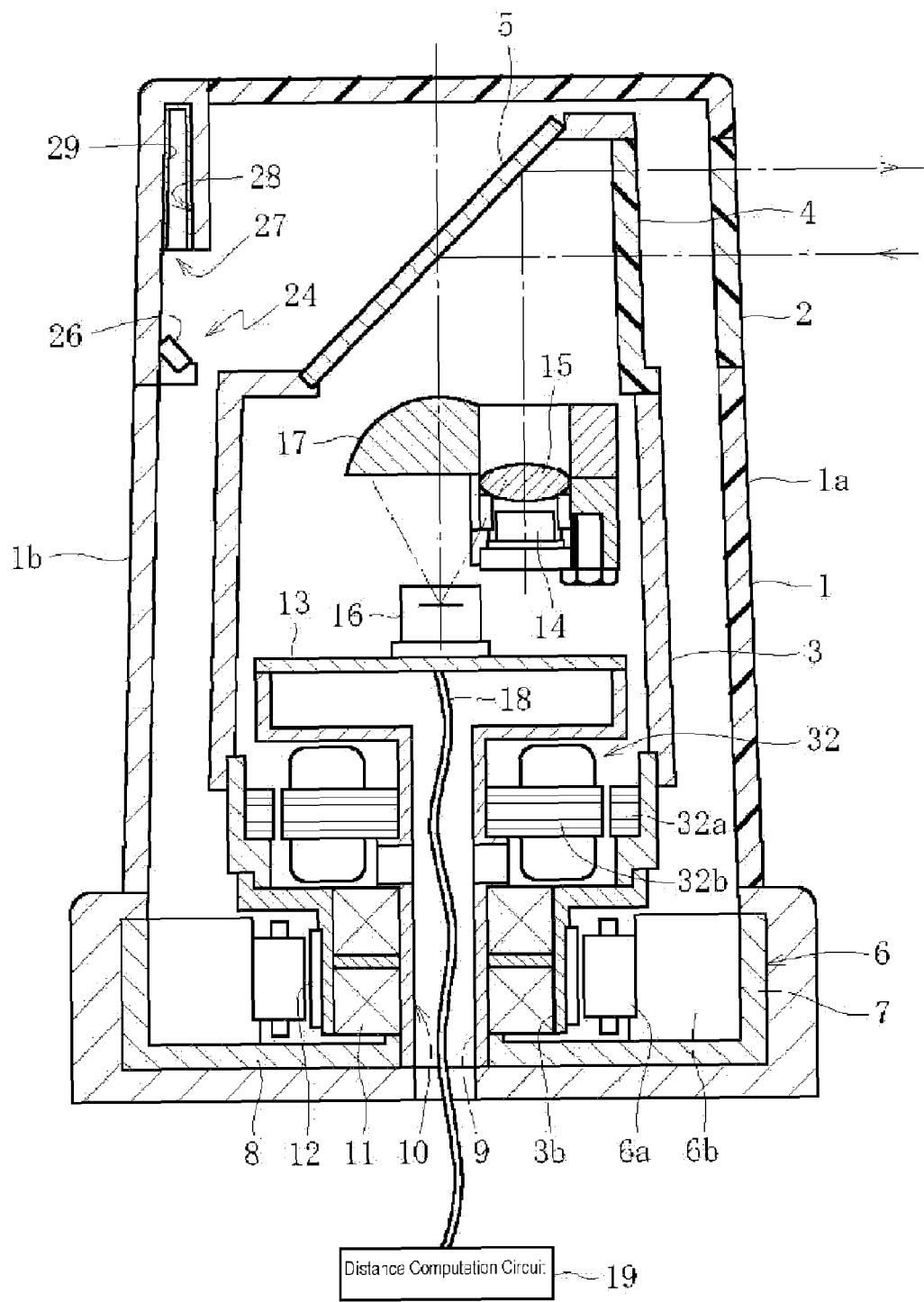
FIG. 8 is a vertical sectional view of a scanning rangefinder involving the second embodiment of the present invention.
Figure 9:
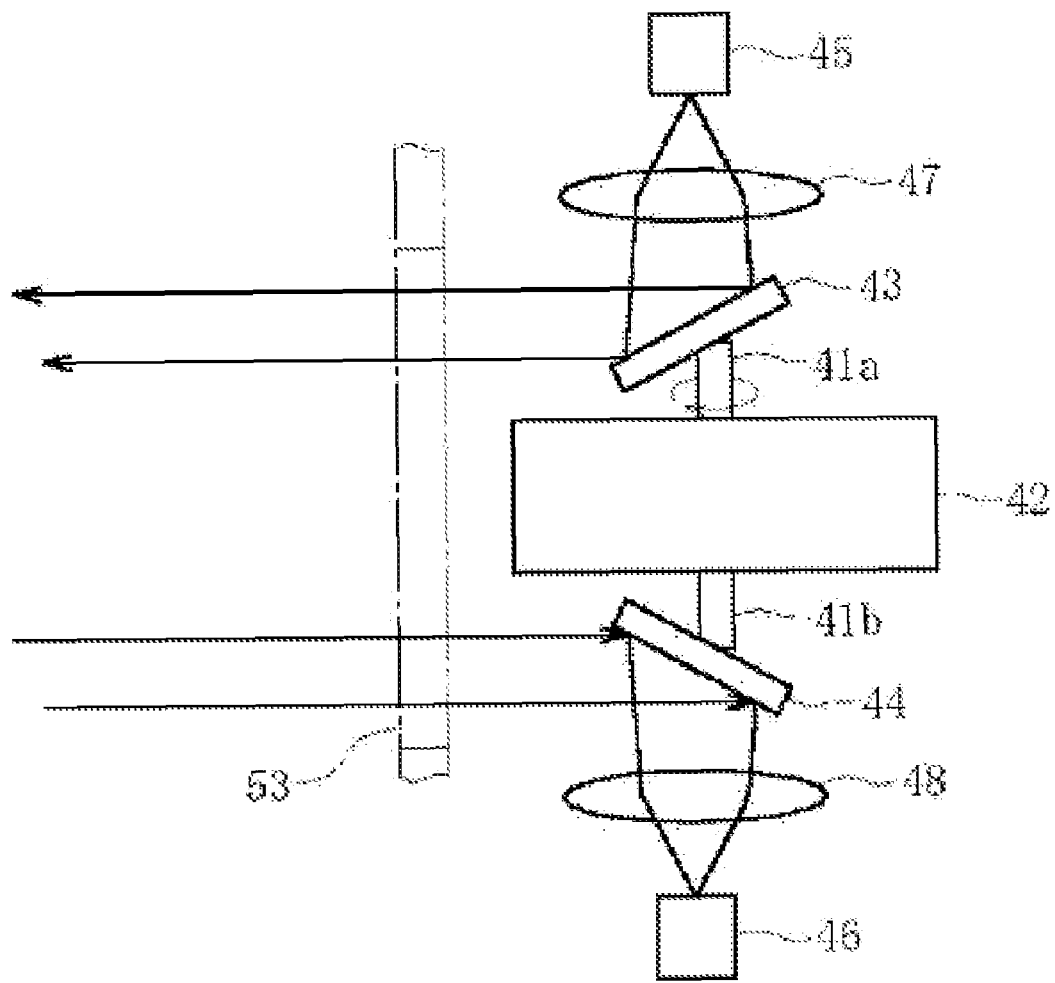
FIG. 9 is a conceptual diagram of one example of a conventional scanning rangefinder.
Figure 10:
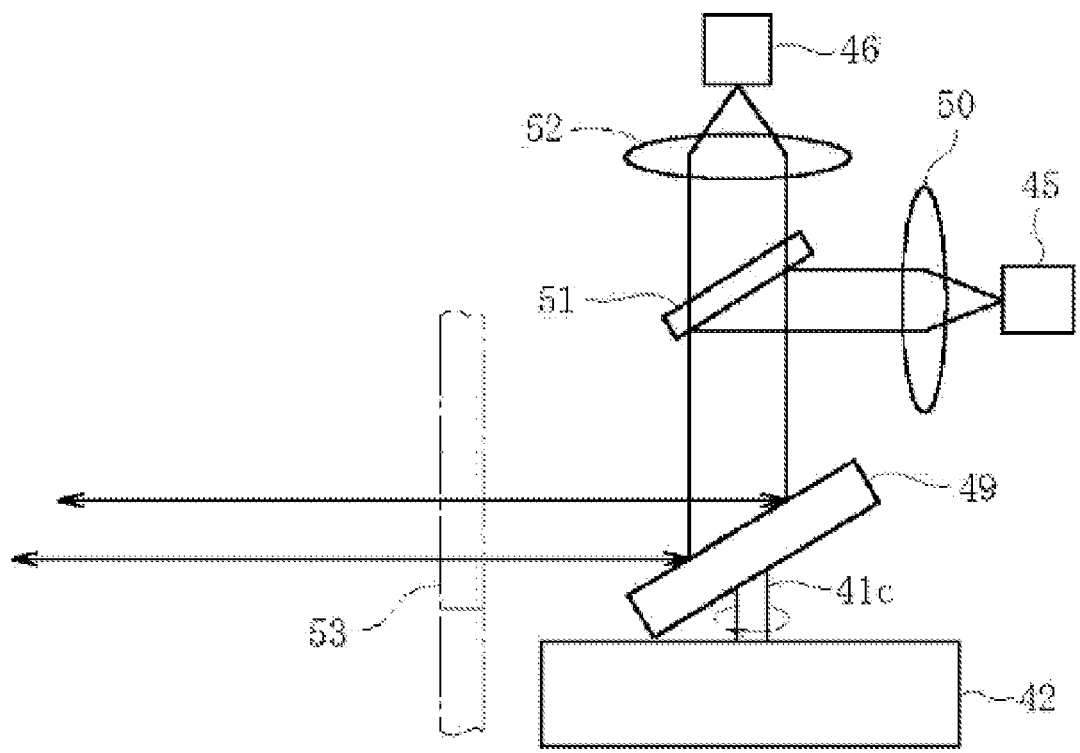
FIG. 10 is a conceptual diagram of a different example of a conventional scanning rangefinder.

Next, a second embodiment of the present invention will be described based on FIG. 8. In this embodiment, instead of the rotational position detector 20, composed of the motor drive clock 21 and the optical interrupter switch 22, of the first embodiment as illustrated in FIG. 1, a resolver 32 having a rotational angle sensor is adopted as the rotational position detector. The rotational-angle-sensor-equipped resolver 32 includes: as a rotor, an undulating-surfaced magnetic member 32a having, for example, four smooth contours formed along the entire circuit of the inner circumferential surface of the cylindrical rotary unit 3; and, opposed to the undulating surface 32a, a resolver stator 32b having windings situated by the outer circumferential surface of the base portion of the disk part 13. Apart from the configuration of the resolver as the rotational position detector, this embodiment is similar to the embodiment illustrated in FIG. 1.

In this embodiment, the rotational-position detecting function of the rangefinder operates according to change in permeance between undulating-surfaced magnetic member 32a and the resolver stator 32b, with higher precision by comparison to the rotational position detector 20 represented in FIG. 1. Moreover, with power supply to the cylindrical rotary unit 3 being unnecessary, in that only optical elements such as mirrors, and the undulating-surfaced magnetic member 32a of the resolver 32 are on the rotary unit 3, the durability and reliability of the rangefinder can be greatly improved.

Though embodiments of, and modifications to embodiments of, the present invention have been described above, a scanning rangefinder of the present invention is not limited to the foregoing embodiments, and it is a matter of course that within bounds that do not depart from the gist of the present invention, various modifications can be added. For example, the rotational-angle-sensor-equipped resolver 32, depicted in FIG. 8, as the rotational position detector 20 may be adopted in the embodiment modifications of FIGS. 5 through 7. For example, a structure in which cooling of the beam projector 14 of FIG. 1 is readily effected is realizable by disposing the beam projector 14 in contact with a heatsink, situated on the disk part 13, constituted by a metal of high thermal conductivity, such as aluminum or copper. Another example is that although in the foregoing embodiments it has been assumed that the motor 6 rotates unidirectionally at constant speed, the motor 6 can be controlled so as to reciprocate within a predetermined angle—e.g., the angular extent of first member 1b of the outer cover 1. The rangefinder in this implementation scans irradiated targets only through a predetermined span that is an extension of the outer circumference. Furthermore, it is possible to realize broad angle scanning over a wide range up and down vertically—in other words, three-dimensional scanning-by tilting the entire rangefinder, including the outer cover 1, with respect to the rotational axis of the motor 6, and swinging the rangefinder about that axis, with a predetermined periodicity.

In addition to the functionality discussed above, functions such as the following can be added in implementations of the present invention. For example, to realize the lowering of power consumption, the rangefinder can be supplemented with a mechanism by which it can be switched into an energy-saving mode during periods when the range-finding operation is not necessary to the robot in which the rangefinder is installed. During energy-saving mode, operation of the motor 6 and the beam projector 14 is halted, and the distance computation circuit 19 is put into a "sleep" state. Such an implementation means that an external start-up signal is separately required. On the other hand, the rangefinder in this case may be configured so that the distance computation circuit 19 operates discontinuously, with an external communication signal made constantly in effect. In a rangefinder in which power consumption during ordinary operation is 2.5 W, for example, in the former instance, the power consumption would be practically zero, while in the latter case the power consumption would be 0.5 W or so.

What is claimed is:

1. A scanning rangefinder comprising:
    a beam projector that emits a scanning beam as electromagnetic radiation onto a scanning target;
    a ray receiver that receives the scanning beam reflected from the scanning target;
    a distance computation circuit connected to the ray receiver that computes a distance between the rangefinder and the scanning target based upon the scanning beam reflected from the scanning target;
    a rotary unit that can be driven rotationally about a rotational axis;
    a rotor magnet connected to a lower portion of the rotary unit;
    a stator opposing the rotor magnet along the stator's circumference and arranged to impart a rotational drive force to the rotary unit;
    a stationary shaft that is located along the rotational axis in the interior of the rotary unit;
    a rotational position detector that detects a rotational position of the rotary unit; and
    a dual-use reflector located in an upper portion of the rotary unit and arranged to reflect the scanning beam emitted from the beam projector to outside of the rotary unit toward the scanning target, to reflect the scanning beam reflected from the scanning target toward the ray receiver, and to rotate with the rotary unit; wherein
    the ray receiver is located on an upper end portion of the stationary shaft.

2. A scanning rangefinder according to claim 1, wherein:
    the electromagnetic radiation is light;
    the beam projector includes a laser, LED, or an optical emission source;
    the ray receiver is a light receiver; and
    the dual-use reflector is a dual-use mirror.

3. A scanning rangefinder according to claim 2, further comprising a receiving lens arranged in between the dual-use mirror and the light receiver; wherein
    the beam projector is situated on an inner wall of the rotary unit.

4. A scanning rangefinder according to claim 3, further comprising a scanning mirror arranged in between the dual-use mirror and the beam projector; wherein the scanning mirror is situated above the receiving lens.

5. A scanning rangefinder according to claim 3, further comprising a scanning mirror arranged in between the dual-use mirror and the beam projector; wherein
    the scanning mirror is situated below the receiving lens.

6. A scanning rangefinder according to claim 3, wherein the receiving lens includes a clearance hole through which the scanning beam is transmitted.

7. A scanning rangefinder according to claim 2, wherein the dual-use mirror has a scanning mirror section and a receiving mirror-lens section.

8. A scanning rangefinder according to claim 1, further comprising a waveguide system that guides the scanning beam emitted from the beam projector into the upper portion of the rotary unit; wherein
    the dual-use reflector is inclined at a predetermined angle with respect to the rotational axis of the rotary unit; and
    the scanning beam emitted from the beam projector is guided by the waveguide system into the upper portion of the rotary unit toward the dual-use reflector.

9. A scanning rangefinder according to claim 1, further comprising:
    a scanning optical system that guides the scanning beam emitted from the beam projector to the dual-use reflector; and
    a receiving optical system that focuses the scanning beam reflected from the scanning target along the rotational axis onto the ray receiver; wherein
    the rotary unit includes:
        a rotary-unit encompassing wall portion; and
        a rotary-unit ceiling portion; wherein
        at least a portion of the ceiling portion includes the dual-use reflector; and
    the scanning optical system and the receiving optical system are included within a space defined by the rotary-unit ceiling portion, the rotary-unit encompassing wall portion, and the upper end portion of the stationary shaft.

10. A scanning rangefinder according to claim 1, further comprising:
    a scanning optical system that guides the scanning beam emitted from the beam projector to the dual-use reflector; and
    a receiving optical system that focuses the scanning beam reflected from the scanning target onto the ray receiver; wherein
    at least one of the scanning optical system and the receiving optical system are included within a space below the dual-use reflector and above the stationary shaft.

11. A scanning rangefinder according to claim 10, wherein:
    the scanning optical system is arranged to guide the scanning beam emitted from the beam projector along the rotational axis; and
    the receiving optical system is arranged to focus the scanning beam reflected from the scanning target along the rotational axis.

12. A scanning rangefinder according to claim 1, wherein the rotary unit is unidirectionally and continuously rotated.

13. A scanning rangefinder according to claim 1, wherein the rotary unit is swung back and forth through a predetermined angle of sweep.

14. A scanning rangefinder according to claim 1, wherein the distance computation circuit is configured for AM based processing.

15. A scanning rangefinder according to claim 1, wherein the rotational position detector includes:
    a motor drive clock located on a circumference of the rotary unit; and an optical interrupter switch anchored along a course that the motor drive clock travels.

16. A scanning rangefinder according to claim 1, further comprising:
- a fixed outer cover having a transparent window and enclosing the rotary unit; and
- a scanning/receiving window located in a portion of a circumferential wall of the rotary unit at the same height as the transparent window, through which the scanning beam is transmitted into and out of the rotary unit.

17. A scanning rangefinder according to claim 16, further comprising:
- a scanning optical system that guides the scanning beam emitted from the beam projector to the dual-use reflector; and
- a receiving optical system that focuses the scanning beam reflected from the scanning target along the rotational axis onto the ray receiver; wherein
- at least one of the scanning optical system and the receiving optical system are included within a space below the dual-use reflector and above the stationary shaft.

18. A scanning rangefinder according to claim 16, further comprising a zero calibrator located inside the fixed outer cover that gauges a standard length inside the rangefinder while in a reverse-detecting mode.

19. A scanning rangefinder according to claim 16, further comprising a photoabsorber-based noise calibrator inside the fixed outer cover.

20. A scanning rangefinder according to claim 1, wherein information obtained from the ray receiver and information outputted by the rotational position detector are transmitted to the distance computation circuit through the interior of the stationary shaft.

21. A scanning rangefinder according to claim 1, wherein the rotational position detector is a rotary-angle-detecting resolver.

\* \* \* \* \*